United States Patent
Milton

(10) Patent No.: US 8,541,699 B2
(45) Date of Patent: Sep. 24, 2013

(54) ADJUSTABLE MODULE

(75) Inventor: Stefan Milton, Ramdala (SE)

(73) Assignee: Roxtec AB, Karlskrona (SE)

( * ) Notice: Subject to any disclaimer, the term of this patent is extended or adjusted under 35 U.S.C. 154(b) by 530 days.

(21) Appl. No.: 12/733,267

(22) PCT Filed: Aug. 21, 2008

(86) PCT No.: PCT/SE2008/050940
§ 371 (c)(1),
(2), (4) Date: Apr. 22, 2010

(87) PCT Pub. No.: WO2009/025615
PCT Pub. Date: Feb. 26, 2009

(65) Prior Publication Data
US 2010/0212107 A1    Aug. 26, 2010

(30) Foreign Application Priority Data
Aug. 22, 2007    (SE) ........................... 0701909

(51) Int. Cl.
H02G 3/18    (2006.01)
H01B 17/26    (2006.01)
H01B 17/58    (2006.01)
H01B 7/00    (2006.01)
F16L 5/00    (2006.01)

(52) U.S. Cl.
USPC ................... 174/659; 174/152 G; 174/153 G; 174/72 A; 174/650; 248/56

(58) Field of Classification Search
USPC ................ 174/651, 152 G, 153 G, 72 A, 650, 174/659; 248/56
See application file for complete search history.

(56) References Cited

U.S. PATENT DOCUMENTS

| 3,775,204 A | * | 11/1973 | Thompson et al. | 156/53 |
| 4,892,990 A | * | 1/1990 | Acheson | 219/76.14 |
| 7,005,579 B2 | * | 2/2006 | Beele | 174/653 |
| 2004/0169341 A1 | * | 9/2004 | Hellkvist | 277/603 |

FOREIGN PATENT DOCUMENTS

| EP | 0 429 916 | | 6/1991 |
| GB | 2 186 443 | | 8/1987 |
| JP | 10311472 A | * | 11/1998 |
| WO | WO 03/025446 | | 3/2003 |

OTHER PUBLICATIONS

International Search Report.

* cited by examiner

*Primary Examiner* — Hoa C Nguyen
*Assistant Examiner* — Binh Tran
(74) *Attorney, Agent, or Firm* — Harness, Dickey & Pierce, P.L.C.

(57) ABSTRACT

A module forming a part of a lead-through or transit for cables, pipes or the like is disclosed. In at least one embodiment, the module includes two base parts forming an outer part of the module. Two holding parts form an inner part of the module. Inside the inner part, formed of the two holding parts a cable or the like is received. The inner part of the module is received turnable inside the outer part of the module.

12 Claims, 3 Drawing Sheets

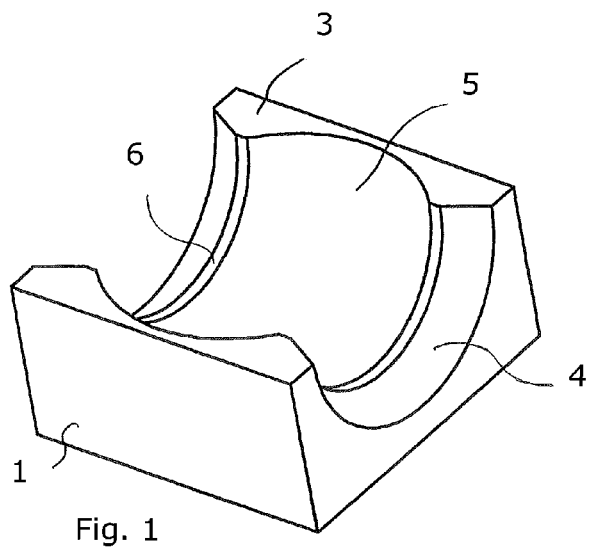
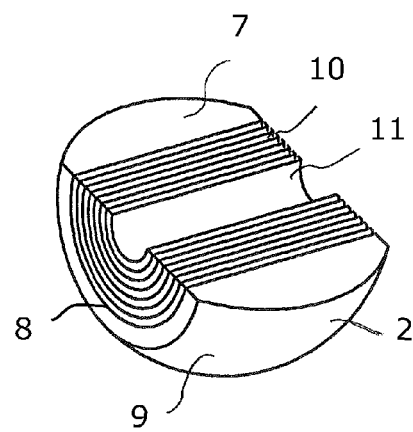
Fig. 1
Fig. 2
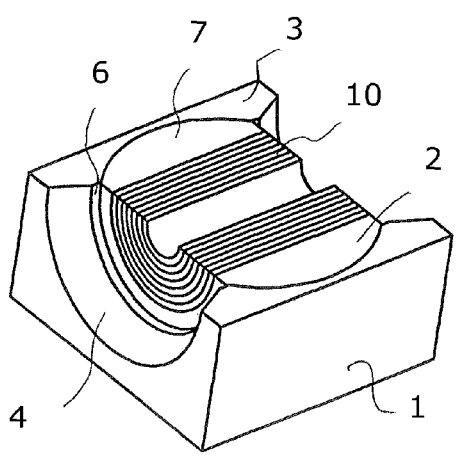
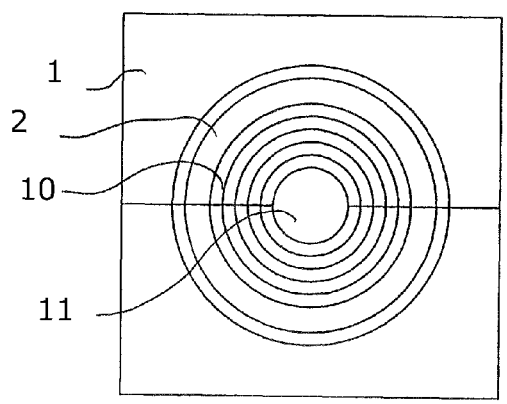
Fig. 3
Fig. 4
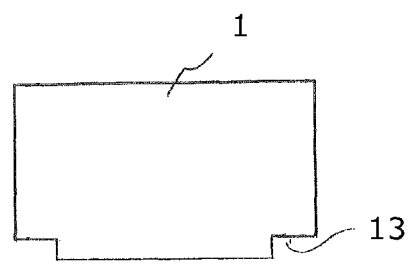
Fig. 5

ADJUSTABLE MODULE

TECHNICAL FIELD

The present invention concerns a lead-through or transit for cables, pipes or the like. The invention especially concerns a module forming a part of a cable transition or the like.

PRIOR ART

In the prior art there are cable transitions or the like having a frame, inside which a number of modules to receive cables, wires or pipes are placed. The modules are made of an elastic material e.g. rubber or plastics and are thus compressible. Inside the frame normally a number of modules are received side by side in one or more rows together with some kind of compression unit. The compression unit is placed between the frame and the modules in such a way that when the compression unit is expanded the compressible modules will be compressed around the cables, wires or pipes. For ease of description the expression "cable" is mainly used in this description, but it should be construed broadly and a person skilled in the art realises that it normally also covers pipes or wires.

Another type of cable transition, pipe penetration etc. has a general cylindrical form and is to be received in a sleeve in a wall or an opening in a wall. To function in the desired way the seal having the form of a module should fit snugly into the sleeve or the opening of the wall in which it is received and the seal should be able to adapt to the actual mounting dimension. The mounting dimension is dictated by the inner diameter of the sleeve or the opening. Furthermore, the pipes or cables received may have different outer diameters, and, thus, the module should be adaptable to cables or pipes having different outer diameters.

Cable transitions of both the above kinds are used for sealing in many different environments, such as for cabinets, technical shelters, junction boxes and machines. They are used in different industrial environments, such as automotive, telecom, power generation and distribution, as well as marine and offshore. The modules may have to seal against fluid, gas, fire, rodents, termites, dust, moisture etc., and may receive cables for electricity, communication, computers etc. or pipes for different gases or liquids such as water, compressed air, hydraulic fluid and cooking gas.

The cables etc. are normally forced to go straight through the modules, i.e. without any inclination in relation to the module or a frame receiving a number of modules. However, in many installations the cables do not come straight into the module, due to available space, the position of the cable before and after the frame etc. Thus, in such transitions the cables are forced to go straight through the module, even if the cables incline in relation to the frame or a wall. Depending on the type of cable used and the dimensions of it, a module may be exposed to relatively high forces from a cable going from an inclined position to a straight position. Forces of inclined cables or the like on the modules may impair the sealing effect of the modules. Furthermore, if the cables or the like are bent by being forced to go straight through the modules, the risk of rupture increases.

SUMMARY OF THE INVENTION

In view of the above the modules inside the frame or a module received in a wall should be able to take up forces caused by inclined cables or pipes. According to the present invention such forces are taken up, at least partly, in that the cables are allowed to incline inside the module. This is achieved in that an outer part of the module is formed of two base parts and an inner part is formed of two holding parts. The inner part of the module is received turnable inside the outer part and the cable, pipe or wire is received inside the inner part.

Further objects and advantage of the present invention will be obvious to a person skilled in the art when reading the detailed description below.

As used in this description the expressions "axial", "radial" and similar expressions are in relation to a cable received inside a module according to the present invention.

BRIEF DESCRIPTION OF THE DRAWINGS

The invention will be described further below by way of examples and with reference to the enclosed drawings. In the drawings:

FIG. 1 is a perspective view of one example of a base part used in the present invention, FIG. 2 is a perspective view of a holding part to be used with the base part of FIG. 1, FIG. 3 is a perspective view of a module half formed of the parts of FIGS. 1 and 2, FIG. 4 is an end view of two module halves of FIG. 3 brought together to form a module, FIG. 5 is a side view of an alternative base part.

DETAILED DESCRIPTION OF PREFERRED EMBODIMENTS

Figures 6, 7:
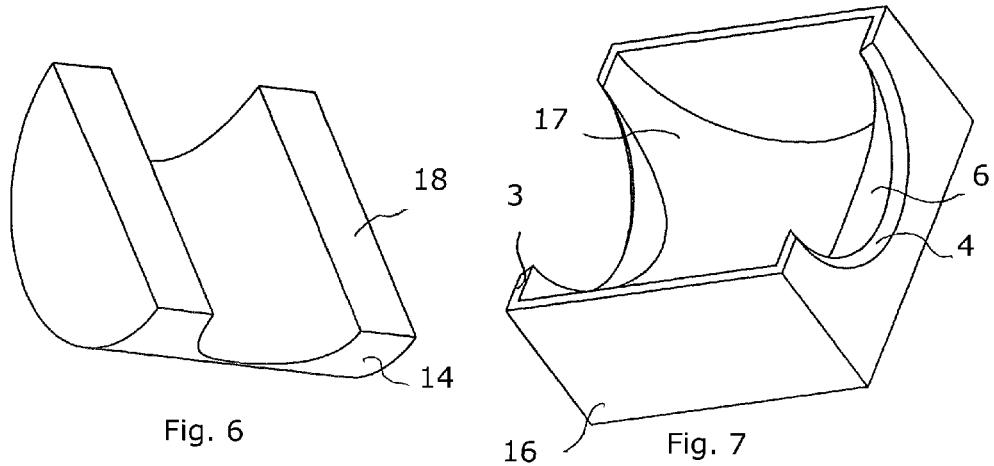
FIG. 6 is a perspective view of an alternative holding part.
FIG. 7 is a perspective view of one base part able to use with the holding part of FIG. 6.

In FIG. 4 one embodiment of a module according to the present invention is shown, which module is formed of parts shown in the FIGS. 1-3. The module has two base parts 1, forming an outer module part when brought together. The base parts 1 are identical. Inside each base part 1 a holding part 2 is received. The base parts 1 have a generally rectangular outer appearance and a cavity on the inside with a generally semi cylindrical extent. The semi cylindrical cavity is extended in the axial direction of a cable received inside the module. At the upper side of each base part 1, flat contact surfaces 3 are formed for contact with corresponding contact surfaces 3 of a further base part 1. The contact surfaces 3 have a generally horizontal extent and are perpendicular to the outer sides of the base part 1. Thus, the outer module part is formed by two base parts 1 being brought together, with the contact surfaces 3 of the two base parts 1 in contact with each other.

A central, semi spherical support 5 is formed on the inside of each base part 1, forming a part of the generally cylindrical cavity. The semi spherical support 5 has the form of a bowl and is placed centrally in the base part 1. A holding part 2 is received in the semi spherical support 5. The holding part 2 has a generally semi spherical outer surface 9 received inside the semi spherical support 5 of the base part 1. The semi spherical outer surface 9 of the holding parts 2 is cut to form two opposing straight ends. The base parts 1 brought together form a central through opening formed by the semi spherical support 5 and a bevelled part 4 at each end of the through opening. The bevelled parts 4 widen outwards in axial direction from the semi spherical support 5 towards the ends of the base part 1. Between the bevelled parts 4 and the semi spherical support 5 of each base part 1 an edge 6 is formed, having a plan, short extension in axial direction. The cut ends of the spherical inner part of the module are placed adjacent the edges 6 between each bevelled part 4 and the spherical support 5. Thus, in axial direction the spherical support 5 is going over into the bevelled parts 4 at each end via the edge 6, having a short axial extent.

The holding parts 2 each have an inner, semi cylindrical surface 8 on which a number of peelable sheets 10 or layers are received. The sheets 10 extend over the total inner surface 8 of each holding part 2. The sheets 10 form a semi cylindrical channel 11 in the middle. By peeling off an appropriate number of sheets 10 the dimension of the channel 11 is increased and adapted to the dimension of the cable to be received. If the module is placed in a frame without receiving a cable or the like a blind is placed in the opening formed of the channels 11 of two holding parts 2 brought together. If the module is to receive a cable at a later stage the blind is removed and the appropriate number of sheets 10 are peeled off. At the upper side of each holding part 2 generally horizontal and flat contact surfaces 7 are formed. The contact surfaces 7 of two holding parts 2 are to abut each other when the two holding parts 2 are brought together.

Figures 9, 10:
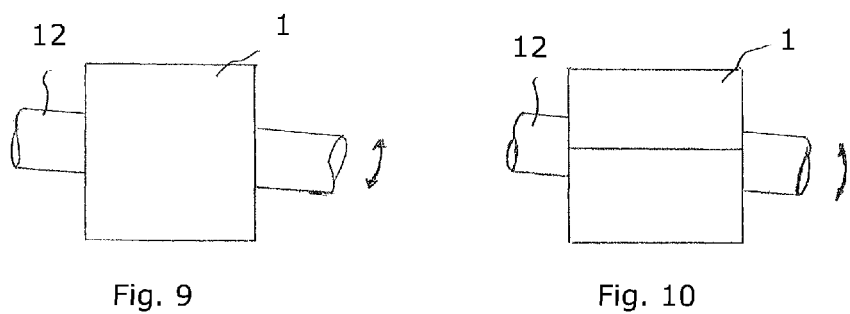
FIG. 9 is a side view of a module according to the present invention with a received cable.
FIG. 10 is a plan view of a module according to the present invention with a received cable.
Figure 11:
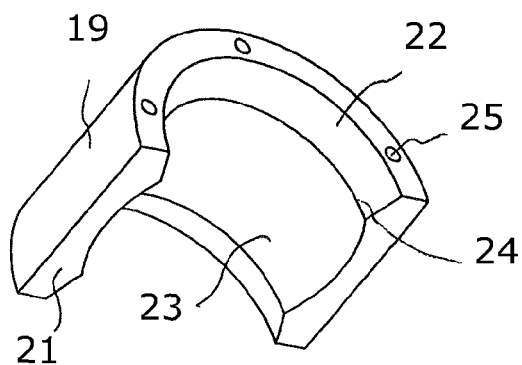
FIG. 11 is a perspective view of a further example of a base part used in the present invention.
Figure 12:
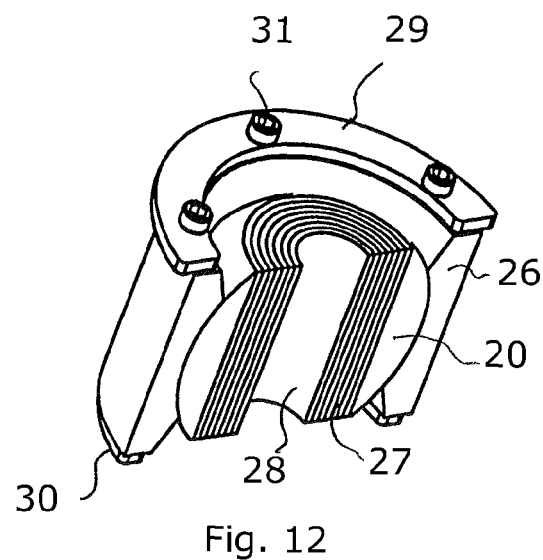
FIG. 12 is a perspective view of a module half including the base part of FIG. 11.

Two holding parts 2 form a sphere with two cut opposite ends when brought together, which sphere forms an inner module part. The cut sphere is received moveable inside an outer module part formed of two base parts 1. The cut sphere formed of the holding parts 2 is moveable in that the outer, spherical surface 9 of each formed sphere can move freely along the inner spherical support 5 of each module. Thus, a cable 12 received inside the formed module may have any inclination in relation to the module, as long as the bevelled parts 4 or the edge 6 at the inside of the module does not hinder such an inclination. The inclination of the bevelled parts 4 and the dimensions of the edge 6 in practice control the maximum inclination of the cable 12. By means of the present invention a cable 12 received in the module 1 may be inclined in different planes, as indicated by FIGS. 9 and 10.

Figure 8:
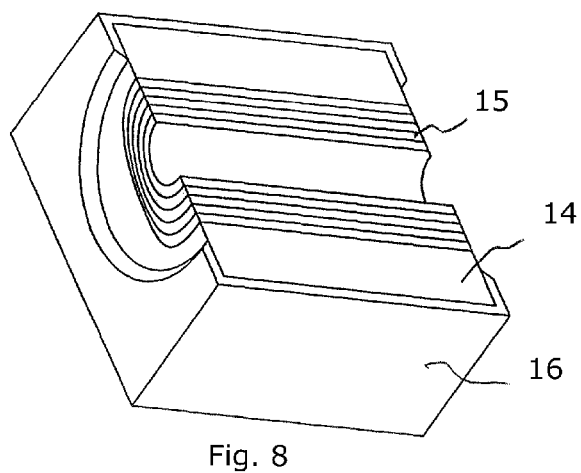
FIG. 8 is a perspective view of the holding part and the base part of FIGS. 6 and 7 brought together.

In the embodiments of FIGS. 6-8 the holding parts 14 have the form of semi cylinders. The holding parts 14 have flat parts 18, which are to abut each other when two holding parts 14 are brought together. In the middle of each flat part 18 a semi cylindrical recess is formed. These recesses are to receive a set of peelable sheets 15 each. When the holding parts 14 are brought together the recesses form an opening extending perpendicular to the cylinder formed of the two holding parts 14. The only difference between a base part 16 adapted for use with the semi cylindrical holding part 14 and the previously described base part is the form of the support for the holding part. Thus, the semi spherical support of the previously described base parts is replaced by a semi cylindrical support 17. The base part 16 for the semi cylindrical holding parts 14 still has a bevelled part 4 and an edge 6 on each side of a support, seen in axial direction.

By giving the holding part 14 the form of a cylinder, and adapting the inner surface of the base part 16 after the cylinder, it is possible to give a cable 12 different inclinations in only one plane. In the shown embodiment the cable 12 is moveable only in a vertical plane (FIG. 10). To achieve this the cylinder is placed in a horizontal direction and transversal to the extension of the cable 12. The inner support surface of each base part 16 is given a form making it possible for the formed cylinders to rotate around their axes. For cylinders extended in a horizontal direction the formed cylindrical support surface of the base parts 16 will be extended in a horizontal direction.

Normally the modules of FIGS. 1-4 and 6-10 are placed in standardized frames. In some instances the parts encircling a cable should have a certain thickness, for example due to regulations regarding tightness, said minimal thickness is often reflected in the size of the standardized frames. The total length of the base parts of the modules of the present invention exceeds the length of the holding parts, due to the bevelled parts 4. In order to adapt the modules to standardized frames the outer surfaces of the base parts may have cuts 13 at the ends to adapt the modules to the size of the frame.

Figure 13:
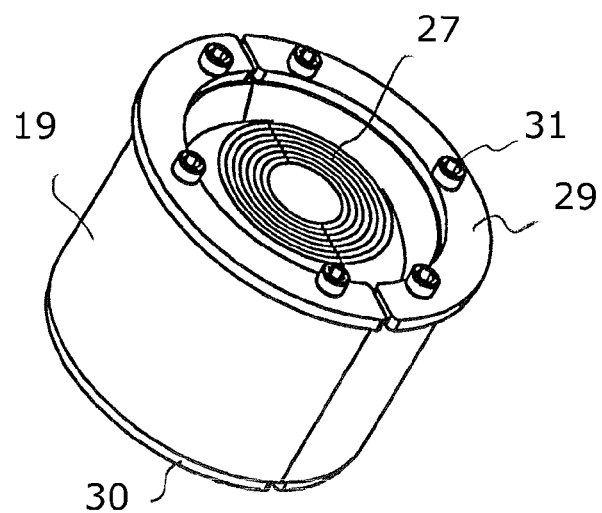
FIG. 13 is a perspective view of a module formed of two module halves according to FIG. 12.

The module of FIG. 13 is formed of two identical parts, which in use are brought together to form a seal. The two module halves are formed to have a central, cylindrical open space when brought together. A pipe or cable is to be received in said open space. Normally, the module is received in a sleeve, or the like in some kind of wall, which sleeve is fixed to the wall. The module may alternatively be placed in an opening formed directly in a wall.

In the same way as for the modules described above, this module also has an outer module part and an inner module part, moveable in relation to each other. The main difference being the outer form of the outer module part. The outer module part is formed of two base parts 19, which are identical. Inside each base part 19 a holding part 20 is received. The base parts 19 have a cavity on the inside with a generally semi cylindrical extent. The semi cylindrical cavity is extended in the axial direction of a cable or pipe received inside the module. At the upper side of each base part 19, flat contact surfaces 21 are formed for contact with corresponding contact surfaces 21 of a further base part 19.

In the same way as described for the module of FIG. 4, a central, semi spherical support 23 is formed on the inside of each base part 19, forming a part of the generally cylindrical cavity. The semi spherical support 23 has the form of a bowl and is placed centrally in the base part 19. A holding part 20 is received in the semi spherical support 23. The holding part 20 has a generally semi spherical outer surface received inside the semi spherical support 23 of the base part 19. The semi spherical outer surface of the holding parts 20 is cut to form two opposing straight ends. The base parts 19 brought together form a central through opening formed by the semi spherical support 23 and a bevelled part 22 at each end of the through opening. The bevelled parts 22 widen outwards in axial direction from the semi spherical support 23 towards the ends of the base part 19. Between the bevelled parts 22 and the semi spherical support 23 of each base part 19 an edge 24 is formed. The cut ends of the spherical inner part of the module are placed adjacent the edges 24 between each bevelled part 22 and the spherical support 23. Thus, in axial direction the spherical support 23 is going over into the bevelled parts 22 at each end via the edge 24.

The holding parts 20 each have an inner, semi cylindrical surface on which a number of peelable sheets 27 or layers are received. The sheets 27 extend over the total inner surface of each holding part 20. The sheets 27 form a semi cylindrical channel 28 in the middle. A blind may be placed in the opening formed of the channels 28 of two holding parts 20 brought together. At the upper side of each holding part 20 generally horizontal and flat contact surfaces 26 are formed. The contact surfaces 26 of two holding parts 20 are to abut each other when the two holding parts 20 are brought together.

Two holding parts 20 form a sphere with two cut opposite ends when brought together, which sphere forms the inner module part. The cut sphere is received moveable inside an outer module part formed of two base parts 19. The cut sphere formed of the holding parts 20 is moveable in that the outer, spherical surface of each formed sphere can move freely along the inner spherical support 23 of each module.

Each module half has a base part 19 of an elastic material. At the ends of the base part 19 a front fitting 29 and a rear fitting 30 are arranged, respectively. The fittings 29, 30 are held at the base part 19 by means of screws 31. Openings are arranged in the fittings 29, 30 and the base part 19 to receive the screws 31. The screws 31 are threaded at their outer ends to co-operate with threaded openings of the rear fitting 30. The function of the screws 31 co-operating with the fittings 29, 30 is to compress the base part 19 in an axial direction. Even though three screws 31 are used at each seal half in the shown embodiment, any number of screws may be used. In the shown embodiment the screws 31 are of the type socket head cap screws. A person skilled in the art realises that any type of fastening means allowing the fittings 29, 30 to be moved towards each other may be used. Thus, it is possible to use screws and nuts. Preferably, the screws 31 should be possible to tighten from one side.

The front fitting 29 according to the shown embodiment is the fitting on that side of the base part 19 from which the screws 31 normally are manipulated. The rear fitting 30 is placed on the opposite side to the front fitting 29. In many embodiments the front fitting 29 is given an outer radius exceeding the inner diameter of the sleeve or the opening in a wall. This is done for a more precise placing of the module, as the front fitting 29 will abut the end of the sleeve or the wall. Instead of the radius of the front fitting 29 exceeding the inner dimension of the sleeve or opening, a number of extended parts fixed to or integrated with said fitting 29 may extend over the inner radius of the sleeve or the opening.

In use the two module halves are to be placed around the cable or pipe. At installation the blind is first removed. To adapt the seal to the diameter of the cable one or more of the peelable sheets 27 are peeled off. When the appropriate number of sheets 27 has been peeled off the two module halves are placed surrounding the cable. Then the screws 31 are turned in such a way that the front and rear fittings 29, 30 will be moved towards each other. As the fittings 29, 30 move towards each other the base parts 19 are compressed in the axial direction. The axial compression of the base parts 19 leads to an expansion of the base parts 19 in the radial direction. The base parts 19 will expand radially both inwards and outwards and, thus, seal both outwards towards the available space and inwards towards the pipe or cable. The expansion outwardly also means that the module will be securely fixed in the sleeve or opening.

A person skilled in the art realises that also this type of module may be adapted to be used with semi cylindrical holding parts, as the one shown in FIG. 6.

The base parts 1, 16, 19 and the holding parts 2, 14, 20 are made of a plastic or rubber material and are normally made by compression moulding.

In use the holding parts 2, 14, 20 are adapted to the dimension of the cable 12 or the like to be received, in that an appropriate number of sheets 10, 15, 27 are peeled of. The inner diameter of the opening formed when the two holding parts 2, 14, 20 are brought together should be somewhat smaller than the outer diameter of the cable 12. Two base parts 1, 16, 19 are then brought together with the two holding parts 2, 14, 20 and the cable 12 received between the base parts 1, 16, 19. Normally some lubricant is placed on the contact surfaces between the base parts 1, 16, 19 and holding parts 2, 14, 20 to promote movement between these parts. Thus, the lubricant should enhance the possibility for the cable 12 to get an inclined position in relation to the module receiving the cable 12. When all cables 12 etc. are received inside the frame the modules are compressed in a normal way for cable transitions.

The invention claimed is:

1. A compressible module receiving a cable, pipe or wire, the compressible module comprising:
    two base parts forming an outer part of the compressible module; and
    two holding parts forming an inner part of the compressible module, the inner part being turnable in the outer part and the cable, pipe or wire being received inside the inner part of the compressible module wherein
        the inner part of the compressible module is received turnable in any direction, the two holding parts forming a generally spherical outer surface received on a spherical contact surface formed of the two base parts when the two base parts and the two holding parts are brought together to form the compressible module, and
        each of the base parts includes a central semi spherical support, a bevelled part at each end in an axial direction and an edge, having a plan, short extension in the axial direction, placed between the semi spherical support and each of the bevelled parts, and wherein each bevelled part expands outwardly from the semi spherical support towards an end of the compressible module, as seen in the axial direction.

2. The compressible module of claim 1, wherein each of the holding parts includes a semi spherical outer surface, a semi cylindrical inner surface and contact surfaces for contact between two holding parts brought together and wherein the spherical outer surface of each of the holding parts is cut to form two opposing straight ends.

3. The compressible module of claim 2, wherein a set of peelable sheets is received on the semi cylindrical inner surface of each of the holding parts.

4. The compressible module of claim 1, wherein the inner part of the compressible module is received rotatable inside the outer part of the compressible module, and wherein the two holding parts form a cylinder received on a curved contact surface formed of the two base parts, when the two base parts and the two holding parts are brought together to form the compressible module.

5. The compressible module of claim 4, wherein each of the holding parts includes the form of a semi cylinder, with a set of peelable sheets in a recess at the centre of each of the holding parts.

6. The module of claim 5, wherein the cylindrical holding parts are extended in a horizontal direction in the formed module and perpendicular to a cable received in the compressible module.

7. The compressible module of claim 1, wherein each of the base parts includes contact surfaces for contact with a corresponding base part when two base parts are brought together to form a module.

8. The compressible module of claim 1, wherein each of the base parts includes a cut at the lower edges perpendicular to the direction of a cable received in the compressible module.

9. The compressible module of claim 1, wherein a lubricant is placed between the base parts and the holding parts.

10. The compressible module of claim 1, wherein the compressible module includes a generally rectangular outer surface.

11. The compressible module of claim 1, wherein the compressible module includes a generally cylindrical outer surface.

12. The compressible module of claim 1, wherein the cable, pipe or wire passes completely through the module.

* * * * *